A. CORNELL.
MEANS FOR RAISING AND LOWERING AGRICULTURAL AND OTHER MACHINES.
APPLICATION FILED NOV. 9, 1914.
1,171,705.
Patented Feb. 15, 1916.
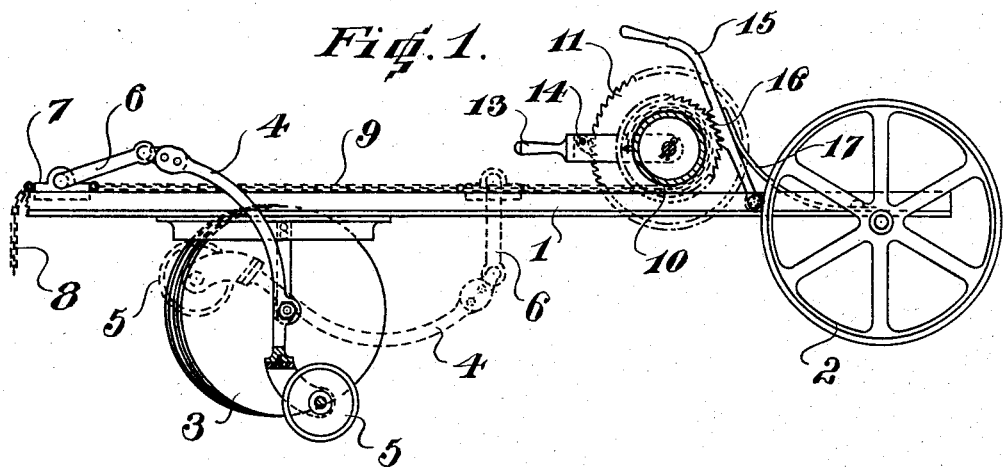
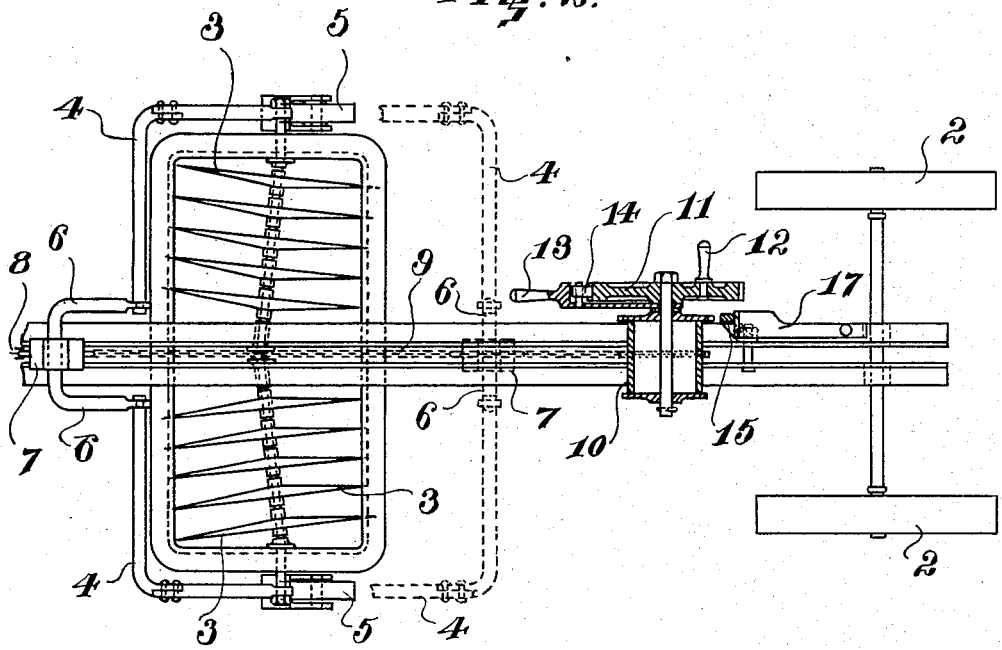
Witnesses:-
Frank William Pattison.
Colin Douglas McCreddie.
Inventor:-
Archer Cornell,
by Rayner & Co.
Attorneys.

UNITED STATES PATENT OFFICE.

ARCHER CORNELL, OF EMOYENI, ZULULAND.

MEANS FOR RAISING AND LOWERING AGRICULTURAL AND OTHER MACHINES.

1,171,705.  Specification of Letters Patent.  Patented Feb. 15, 1916.

Application filed November 9, 1914. Serial No. 871,181.

*To all whom it may concern:*

Be it known that I, ARCHER CORNELL, sugar planter, subject of the King of Great Britain and Ireland, residing at Emoyeni, Zululand, have invented new and useful Improvements in Means for Raising and Lowering Agricultural and other Machines, of which the following is a specification.

This invention comprises improvements in means for raising and lowering agricultural and other machines, and has for its object to provide means for utilizing the tractive effort of the team or other means employed, to raise a machine from its working position on to suitable running wheels, in order to enable it to be turned around or transported from place to place.

A further object is to enable the machine to be readily lowered when it is desired to resume working.

According to this invention the machine, such as a disk harrow, plow, or the like, is provided with one or more levers pivoted to a suitable part as for example the main axle. When several levers are employed they may be connected together to form a swing frame. Each lever is fitted at its lower end with a running wheel preferably mounted after the manner of a caster so that such wheel may readily turn about its vertical pivoted axis to allow the machine to be readily turned or steered when supported thereon. The tractive effort is communicated to the lever by a chain or the like and the lever is also connected by a chain with winding means fitted with a catch or locking device. When the machine is working the chain wound on the winding means cannot unwind because such means are locked and consequently although the tractive effort is on the lever the latter remains in the position in which its running wheel is off the ground. Immediately upon releasing the locking device, the tractive effort pulls over the lever and its running wheel is forced on to the ground and raises the machine out of the working position.

A suitable construction is shown by way of example in the accompanying drawing in which:—

Figure 1 is a side elevation of a disk cultivator and Fig. 2 is a plan partly in horizontal section of the framing showing the lever arrangement and the running wheels thereon.

The cultivator comprises a framing 1 rear wheels 2 and the cultivator disks 3 of any known type. On the axle of the disks 3 is pivoted the frame 4 which in effect is a double armed lever, the lower arm at its extremity being fitted with the casters or swiveling running wheels 5. The upper end of the upper arm of the lever or frame 4 is connected by a link 6 with a slider or block 7 which is connected on the one hand with the haulage chain 8 and on the other hand with a chain 9 which is wound around a winding drum 10 mounted on the rear part of the framing 1. Fixed on the axle of the winding drum is a hand wheel 11 which can be operated by the handle 12 to turn the drum 10. The wheel 11 also has ratchet or other suitable teeth on its periphery, and a lever 13 pivoted on the axle of the drum is fitted with a pawl 14 taking into the said teeth. A lever 15 pivoted to the framing carries detents or teeth 16 which catch into the teeth of a ratchet wheel forming one end of the drum 10, and a blade spring 17 constantly presses upon the lever 15 in the direction for maintaining the teeth 16 in engagement with the teeth of the said drum ratchet wheel.

While the machine is at work, the chain 9 is wound up on the drum 10 and is prevented from unwinding by the detent 16. The lever 4 is thus held by the chain in the position seen in dotted lines in Fig. 1, in which position the running wheels or casters 5 are off the ground so as to allow the cultivator disks 3 to operate. When it is desired to raise the machine from its working position and to support it entirely on running wheels, the lever 15 is lifted and removes the detents 16 from the teeth of the drum ratchet wheel. The tractive effort on the chains 8 and 9 is then free to unwind the chain 9 from the drum 10 and to pull the upper arm of the lever 4 forward. Consequently the running wheels 5 are lowered and forced into running contact with the ground as seen in Fig. 1. This movement of the lever is either limited by a suitable stop or stops, or the chain 9 attached to the drum 10 is of just sufficient length to allow the lever 4 to assume the required position. After this position has been attained further tractive effort will simply haul the machine along on its supporting wheels. When it is desired to resume working, the chain 9 must be wound on to the drum 10 again; this is accomplished when the machine is light by simply turning the hand wheel 11 by the handle 12 in the proper direction. When the machine is heavy however the hand lever 13, is worked up and down, the pawl 14 engaging the teeth on the wheel 11 at each alternate stroke of the lever 13 and feeding the wheel around in step by step fashion. The detent 16 holds the wheel 11 and drum 10 in the position to which they have been turned at any moment by the means above described.

It will be obvious that the apparatus is capable of being controlled by the driver or controller of the machine who is able to operate the various devices without leaving his seat.

What I claim as my invention and desire to secure by Letters Patent is:—

1. In means for raising and lowering agricultural and other machines, a two armed lever pivoted to said machine, a running wheel mounted at the free end of the lower arm, a winding drum on said machine, hand operated means to rotate said drum, a haulage chain connected between its ends with the upper arm of said lever and fixedly connected at one end to said drum, and releasable locking means operative upon said drum substantially as set forth.

2. In means for raising and lowering agricultural and other machines, an oscillating frame pivotally mounted on said machine, running wheels at the lower end of said frame, chain connections with the upper end of said frame, a winding drum adapted to wind up one of said chain connections, and a releasable holding means operative upon said drum substantially as specified.

3. In means for raising and lowering agricultural and other machines, a lever pivotally mounted between its ends on said machine, a running wheel mounted on the lower end of said lever, a chain, a drum adapted to wind up said chain, a link connection between the upper end of said lever and said chain, a toothed wheel connected with said drum, a detent adapted to engage the teeth of said wheel, and a spring constantly pressing said detent toward said wheel substantially as set forth.

4. In means for raising and lowering agricultural and other machines, a swingable two armed lever, a running wheel on one arm of said lever, a haulage chain, a link connection between the other arm of said lever and said chain, a drum mounted in bearings on said machine, a ratchet wheel connected with said drum, a detent engaging said ratchet wheel, a spring operative upon said detent to constantly press same toward said ratchet wheel, releasing means for said detent, a lever pivotally mounted on the axis of said drum, and a pawl on said lever in operative engagement with said ratchet wheel substantially as set forth.

5. In a portable machine comprising a main frame and permanent running wheels, the combination of a swingable double ended lever pivotally mounted on said frame, a temporary running wheel of the caster variety on one end of said lever, a haulage chain, a connection between the other end of said lever and said chain, winding means mounted on said frame and operatively connected with said chain, locking means operative upon said winding means, and releasing means operative upon said locking means substantially as set forth.

6. In a portable machine comprising a main frame supported in working position by an implement and permanent running wheels, the combination of a swingable lever pivoted between its ends on said frame, a temporary running wheel of the caster variety on one end of said lever, a haulage chain, a connection between the other end of said lever and said chain, winding means mounted on said frame and operatively connected with said chain, driving means for said drum, locking means constantly tending to engage and hold said drum against an unwinding movement, and releasing means for said locking means, substantially as set forth.

In witness whereof I have hereunto set my hand in the presence of two witnesses.

ARCHER CORNELL.

Witnesses:
H. D. JAMESON,
W. E. ROGERS.

Copies of this patent may be obtained for five cents each, by addressing the "Commissioner of Patents, Washington, D. C."